(12) United States Patent
Hossain et al.

(10) Patent No.: US 12,453,677 B1
(45) Date of Patent: *Oct. 28, 2025

(54) BIOBASED DENTAL FILLER AND METHOD OF PREPARATION THEREOF

(71) Applicant: IMAM MOHAMMAD IBN SAUD ISLAMIC UNIVERSITY, Riyadh (SA)

(72) Inventors: Abm Sharif Hossain, Riyadh (SA); Fazliny Abdul Rahman, Petaling Jaya (MY); Moniruddin Chowdhury, Kedah (MY)

(73) Assignee: IMAM MOHAMMAD IBN SAUD ISLAMIC UNIVERSITY, Riyadh (SA)

( * ) Notice: Subject to any disclaimer, the term of this patent is extended or adjusted under 35 U.S.C. 154(b) by 0 days.

This patent is subject to a terminal disclaimer.

(21) Appl. No.: 19/068,473

(22) Filed: Mar. 3, 2025

(51) Int. Cl.
*A61K 6/898* (2020.01)
*A61K 6/30* (2020.01)
*A61K 6/891* (2020.01)

(52) U.S. Cl.
CPC .............. *A61K 6/898* (2020.01); *A61K 6/30* (2020.01); *A61K 6/891* (2020.01)

(58) Field of Classification Search
CPC ...................................... A61K 6/898
See application file for complete search history.

(56) References Cited

U.S. PATENT DOCUMENTS

| 2017/0027168 A1 | 2/2017 | Heath |
| 2021/0196622 A1 | 7/2021 | González Fernández et al. |
| 2023/0263938 A1 | 8/2023 | Sheran et al. |

FOREIGN PATENT DOCUMENTS

IN 202011056658 A 2/2022

OTHER PUBLICATIONS

Shagun Varshney, et. al., "Silica from waste rice husk and its polymeric hydrogel-based composite filler: synthesis, characterisation, and antibacterial activity", Advances in Materials and Processing Technologies, vol. 10, No. 3, Mar. 23, 2023, pp. 1485-1500, 17 pages.

*Primary Examiner* — Michael F Pepitone
(74) *Attorney, Agent, or Firm* — Oblon, McClelland, Maier &Neustadt, L.L.P.

(57) ABSTRACT

A biobased dental filler includes a nanocomposite including a mixture of nanostarch and nanocellulose obtained from date seed, olive seed, moringa seed coat. The biobased dental filler includes a dye mixture containing root beet dye, ajwa date pigment, and black cumin seed pigment. The biobased dental filler further includes an adhesive mixture containing an okra gel, an aloe vera gel, and an aroid root gum. The biobased dental filler includes a beef toe-based glycerin, an acrylate polymer, an acid hydrolyzed mixture including sheep jawbone and fish bone and an organic composition including at least one selected from the group including cellulose, corn starch, fish scale resin, arrowroot powder, alginate, aroid peel gel, *Acacia nilotica* gum, *Lannea* sp. natural glue, jackfruit latex, dragon peel dye, beetroot dye.

19 Claims, 9 Drawing Sheets

```
                                                           ┌─ 50
┌─────────────────────────────────────────────────────────┐
│ Hydrolyze a mixture of date seed, olive seed, sheep     │
│ jawbone, moringa seed coat, and fish bone with at least │─ 52
│ one inorganic acid to obtain a nanocomposite and an     │
│ acid hydrolyzed mixture                                 │
└─────────────────────────────────────────────────────────┘
                              │
                              ▼
┌─────────────────────────────────────────────────────────┐
│ Combine the nanocomposite with an organic composition,  │
│ a calcium mixture, a zinc mixture, and a plasticizer to │─ 54
│ form a biobased dental filler                           │
└─────────────────────────────────────────────────────────┘
```

BIOBASED DENTAL FILLER AND METHOD OF PREPARATION THEREOF

BACKGROUND

Technical Field

The present disclosure is directed to a dental filler, more particularly, towards a biobased dental filler to repair a decayed or damaged tooth.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

A synthetic filler for dental use refers to a man-made material, typically composite resins, used to restore or enhance the function and appearance of teeth. These materials are commonly used for fillings, bonding, or veneers, offering a natural-looking result. They may be formed by a combination of plastic resins and fine glass particles, often designed to mimic the appearance and function of natural tooth enamel.

Synthetic or artificial materials are usually used in fitting or refilling damaged or fractured teeth for crown or cap purposes. In surgery, synthetic fillers such as polylactic acid, ZnO cement, $Zn_3(PO_4)_2$, silicon, resins, and calcium phosphates (or polymers and copolymers) are used. However, the process can be laborious, time-consuming, and costly, and may pose risks of complications, including additional surgeries if decay occurs. Synthetic or artificial dental filler materials, though widely used, have several disadvantages. They may cause allergic reactions or irritation in some patients, especially with certain resins or metals. They may wear down more quickly compared to stronger materials like amalgam or porcelain, especially under the pressure of chewing and biting. This wear leads to the need for replacements or touch-ups. Additionally, synthetic fillers are prone to staining or discoloration, especially with exposure to foods and drinks like coffee, tea, alcohol, wine, or tobacco, affecting their long-term appearance. Some materials may be brittle, increasing the risk of cracking or breaking, particularly in areas like molars which have high stress. Shrinkage is again a matter of concern, as synthetic fillers may shrink slightly during curing, thereby causing gaps that may lead to tooth sensitivity or decay. Additionally, such materials may not always bond as strongly to natural tooth structure, compromising their long-term durability, and may require more frequent maintenance or replacement. Furthermore, synthetic fillers require precise application, so when not done correctly, they may affect aesthetics or result in further dental issues. Lastly, they typically don't last as long as an alternative option, requiring frequent maintenance.

Each of the aforementioned suffers from one or more drawbacks hindering their adoption. Accordingly, it is one objective of the present disclosure to provide a material that may circumvent the drawbacks such as low durability, non-biodegradability, shrinkage, frequent maintenance and high costs factor, of the materials known in the art.

SUMMARY

In an exemplary embodiment, a biobased dental filler is described. The biobased dental filler includes a nanocomposite including a mixture of nanostarch and nanocellulose obtained from date seed, olive seed, moringa seed coat. Further, the biobased dental filler includes a dye mixture containing root beet dye, ajwa date pigment, and black cumin seed pigment. Still further, the biobased dental filler includes an adhesive mixture containing an okra gel, an aloe vera gel, and an aroid root gum. Furthermore, the biobased dental filler includes a beef toe-based glycerin, an acrylate polymer, an acid hydrolyzed mixture including sheep jawbone and fish bone and an organic composition including at least one selected from the group including cellulose, corn starch, fish scale resin, arrowroot powder, alginate, aroid peel gel, *Acacia nilotica* gum, *Lannea* sp. natural glue, jackfruit latex, dragon peel dye, beetroot dye.

In some embodiments, the biobased dental filler has a carotene content of 1 milligram per gram (mg per g) to 10 mg per g of the biobased dental filler.

In some embodiments, the biobased filler has a polyphenol content of 40 mg per 100 g to 60 mg per 100 g of the biobased dental filler.

In some embodiments, the biobased filler has an anthocyanin content of 95 mg per 100 g to 115 mg per 100 g of the biobased dental filler.

In some embodiments, the biobased filler further includes at least one plasticizer selected from the group including glycerol triacetate, triethyl citrate, acetyl tributyl citrate, polyethylene glycol, polylactic acid, diisononyl phthalate, di(2-ethylhexyl) phthalate, diisodecyl phthalate, and epoxidized soybean oil.

In some embodiments, the nanocellulose is present in the nanocomposite in an amount of 40 (weight percent) wt. % to 60 wt. % relative to a total weight of the nanocomposite.

In some embodiments, the nanostarch is present in the nanocomposite in an amount of 30 wt. % to 45 wt. % relative to a total weight of the nanocomposite.

In some embodiments, the nanostarch has an average particle size of 16 nanometers (nm) or less.

In some embodiments, the nanocellulose has an average particle size of 18 nm or less.

In some embodiments, the biobased dental filler further includes polylactic acid.

In some embodiments, the biobased dental filler further includes a calcium mixture including 1 wt. % to 5 wt. % of calcium oxide (CaO) relative to a total weight of the calcium mixture, where the calcium mixture includes oyster shell, CaO and a calcium phosphate cement.

In some embodiments, the biobased dental filler includes 1 wt. % to 5 wt. % of the calcium mixture relative to a total weight of the biobased dental filler.

In some embodiments, the biobased dental filler further includes 2 wt. % to 8 wt. % of a zinc mixture including zinc oxide (ZnO) and zinc phosphate. ($Zn_3(PO_4)_2$) relative to a total weight of the biobased dental filler.

In another exemplary embodiment, a method of producing the biobased dental filler is described. The method includes hydrolyzing a mixture of date seed, olive seed, sheep jawbone, moringa seed coat, and fish bone with at least one inorganic acid to obtain the nanocomposite and the acid hydrolyzed mixture. Further, the method includes combining the nanocomposite with the organic composition, a calcium mixture, a zinc mixture, and a plasticizer to form the biobased dental filler.

In some embodiments, the inorganic acid is at least one selected from the group including hydrochloric acid, nitric acid, hydrobromic acid, sulfuric acid, hydrofluoric acid, and phosphorous acid.

In some embodiments, the inorganic acid is hydrochloric acid and nitric acid.

In yet another exemplary embodiment, a method of repairing a damaged tooth with the biobased dental filler is described. The method includes removing an area of damage or decay in a tooth to obtain an opening in the tooth. The method includes filling the opening in the tooth with the biobased dental filler. The method includes curing the biobased dental filler to obtain a repaired tooth.

In some embodiments, the curing is photocuring or thermal curing.

In some embodiments, the curing includes curing with a photocuring device for 10 seconds to 30 seconds at a light intensity of 250 milliwatt per square centimeter (mW/cm$^2$) to 850 mW/cm$^2$.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 3C is an image depicting biomaterial, according to certain embodiments.

DETAILED DESCRIPTION

In the drawings, like reference numerals designate identical or corresponding parts throughout the several views. Further, as used herein, the words "a", "an" and the like generally carry a meaning of "one or more", unless stated otherwise.

Furthermore, the terms "approximately," "approximate", "about" and similar terms generally refer to ranges that include the identified value within a margin of 20%, 10%, or preferably 5%, and any values therebetween.

When describing the present disclosure, the terms used are to be construed in accordance with the following definitions, unless a context dictates otherwise.

Embodiments of the present invention will now be described more fully hereinafter with reference to the accompanying drawings wherever applicable, in that some, but not all, embodiments of the disclosure are shown.

In the drawings, like reference numerals designate identical or corresponding parts throughout the several views. Further, as used herein, the words 'a,' 'an' and the like generally carry a meaning of 'one or more,' unless stated otherwise.

Furthermore, the terms 'approximately,' 'approximate,' 'about,' and similar terms generally refer to ranges that include the identified value within a margin of 20%, 10%, or preferably 5%, and any values therebetween.

As used herein, the term 'nanocomposite' refers to a composite material that has at least one component with a grain size measured in nanometers.

A weight percent of a component, unless specifically stated to the contrary, is based on the total weight of the formulation or composition in which the component is included. For example, if a particular element or component in a composition or article is said to have 5 wt. %, it is understood that this percentage is in relation to a total compositional percentage of 100%.

The present disclosure is intended to include all hydration states of a given compound or formula, unless otherwise noted or when heating a material.

As used herein, 'biomaterial' refers to any natural or synthetic substance that is designed to interact with biological systems for medical or therapeutic purposes. These materials are typically used to replace, repair, or enhance biological tissues, organs, or other bodily functions, and can be biodegradable or non-biodegradable.

As used herein, 'nanostarch' refers to a nanoscale form of starch that has been processed to reduce its particle size, typically ranging from 1 to 100 nanometers (nm) in at least one dimension. This highly refined starch exhibits unique properties, such as increased surface area and enhanced reactivity, making it suitable for use in various applications, including biocomposites, coatings, and as a component in biomaterials.

As used herein, 'nanocellulose' refers to cellulose materials that have been broken down into nanoscale fibers, typically ranging from 1 to 100 nm in diameter in at least one dimension. These nanosized cellulose fibers exhibit unique properties, including high strength, biodegradability, and a large surface area, making them suitable for a variety of applications such as in composites, coatings, and biomaterials.

As used herein, 'antioxidants' refers to substances that inhibit or prevent the oxidation of other molecules, thereby protecting cells and tissues from oxidative damage. These compounds neutralize free radicals or reactive oxygen species (ROS) that can cause damage to biological systems. Antioxidants can be naturally occurring, such as vitamins C and E, or derived from plant-based sources, and are often used in various applications, including biomaterials, food preservation, and skincare.

As used herein, 'pyrolysis' refers to a thermochemical process in which organic materials are decomposed by heat in the absence of oxygen. This process breaks down complex organic compounds into simpler molecules, often producing gases, liquids, and solid residues such as charcoal or biochar. Pyrolysis is commonly used in various industries for waste disposal, biofuel production, and the creation of advanced materials, including nanomaterials.

As used herein, 'bioprocessing' refers to the use of biological systems, such as enzymes, microorganisms, or cells, to carry out chemical or biochemical processes. This can involve the transformation of raw materials into valuable products, such as biofuels, biochemicals, or biomaterials, through controlled biological reactions.

As used herein, 'dental filler' refers to a material used to restore or fill cavities, defects, or damage in dental structures, such as teeth. It is typically applied to replace lost tooth structure due to decay, wear, or injury, and can be composed of various materials, including composites, ceramics, or biomaterials, to provide structural support, restore function, and improve the appearance of the affected tooth.

As used herein, 'average particle size' refers to the arithmetic mean of the diameters of the individual particles in a sample, calculated by dividing the sum of the particle sizes by the total number of particles, or, in some cases, determined by other statistical methods such as the volume-weighted average.

As used herein, 'acid hydrolysis' refers to a chemical process in which an acid, typically in high concentration, breaks down complex materials into smaller molecules or particles. This process involves using an aqueous solution of a strong acid to cleave chemical bonds, leading to the conversion of micro-sized particles into nano-sized particles.

An aspect of the present disclosure is directed to a method of forming a nanocomposite dental filler cement biomaterial for the reconstruction, regrowth or filling of damaged tooth crowns or caps. The nanocomposite dental filler of the present disclosure utilizes plant-based nanostarch and nanocellulose, animal bone powder (minerals), and organic dyes (anthocyanin and carotenoid) as antioxidants. The biomaterial is created through bioprocessing and pyrolysis technology, combining these organic substances to develop a sustainable and effective dental filler.

A biobased dental filler is explained herein. It includes a nanocomposite, a dye mixture, an adhesive mixture, a beef toe-based glycerin, an acrylate polymer, an acid-hydrolyzed mixture, and an organic composition. In some embodiments, a biobased dental filler includes a nanocomposite including a mixture of nanostarch and nanocellulose obtained from date seed, olive seed, moringa seed coat, and various plant sources, including corn starch, potato starch, tapioca starch, rice starch, wheat starch, wood pulp, cotton, bamboo hemp, and sugarcane bagasse. These biobased materials, processed into their nanoscale forms, enhance the mechanical properties, biocompatibility, and sustainability of the dental filler, offering an eco-friendly alternative to traditional materials used in dental treatments. In a preferred embodiment, the nanocellulose is obtained from olive seeds and moringa seeds, and the nanostarch is obtained from date seeds.

In some embodiments, a biobased dental filler, includes a dye mixture containing root beet dye, ajwa date pigment, and black cumin seed pigment. In some embodiments, a dye mixture may include, but is not limited to, turmeric extract (curcumin), hibiscus flower extract, *spirulina* extract (chlorophyll and phycocyanin), pomegranate extract, indigo extract (*Indigofera tinctoria*), paprika (*capsicum* extract), annatto extract and saffron. In a preferred embodiment, a combination of dyes (root beet dye, ajwa dates pigment, black cumin seed pigments) is used.

In some embodiments, an adhesive mixture containing an okra gel, an aloe vera gel, and an aroid root gum were used. In a preferred embodiment, adhesive substances like okra gel, aloe vera gel, aroid root gum, and finally, sheep jawbone and fish bone powder (treated as collagen protein and minerals) are used. In a preferred embodiment, a beef toe-based glycerin and an acrylate polymer are used.

In some embodiments, a biobased dental filler, includes an acid hydrolyzed mixture consisting sheep jawbone and fish bone. In a preferred embodiment, date seeds are hydrolyzed with 84% HCl, moringa seed coat starch and olive seed cellulose are hydrolyzed with 84% HCl and 92% $HNO_3$, and fish bone and sheep jawbone are hydrolyzed with 94% $H_2SO_4$.

In some embodiments, a biobased dental filler includes an organic composition including at least one selected from the group consisting of cellulose, corn starch, fish scale resin, arrowroot powder, alginate, aroid peel gel, *Acacia nilotica* gum, *Lannea* sp. natural glue, jackfruit latex, dragon peel dye, beetroot dye. In some embodiments, the biobased dental filler has a carotene content of 1 to 10 milligrams per gram (mg per g), preferably 2-9 milligrams per gram (mg/g), preferably 2.5-8.8 mg/g, preferably 3-8.5 mg/g and preferably 3.5-8 mg/g of the biobased dental filler; the biobased dental filler has a polyphenol content of 40 to 60 mg per 100 g, preferably 41-59 milligrams per 100 gram (mg/100 g), preferably 43-57 mg/100 g, preferably 45-55 mg/100 g, preferably 47-53 mg/100 g and preferably 49-51 mg/100 g of the biobased dental filler. In some embodiments, the biobased dental filler has an anthocyanin content of 95 to 115 mg per 100 g, preferably 96-114 mg/100 g, preferably 97-113 mg/100 g, preferably 98-112 mg/100 g, preferably 99-111 mg/100 g and preferably, 100-110 mg/100 g of the biobased dental filler. In a preferred embodiment, the carotene, polyphenol, and anthocyanin contents are 3.7 mg/g, 50 mg/100 mg, and 107 mg/100 g.

In some embodiments, the biobased dental filler includes at least one plasticizer selected from glycerol triacetate, triethyl citrate, acetyl tributyl citrate, polyethylene glycol, polylactic acid, diisononyl phthalate, di(2-ethylhexyl) phthalate, diisodecyl phthalate, and epoxidized soybean oil. In some embodiments, the biobased dental filler consists of polylactic acid. In a preferred embodiment, the plasticizer used is (5%) polylactic acid.

In some embodiments, the nanocellulose is present in the nanocomposite in an amount of 40 to 60 weight percent (wt. %), preferably 42-59 wt. %, preferably 43-57 wt. %, preferably 45-55 wt. %, preferably 46-54 wt. %, preferably 47-53 wt. %, and preferably 48-52 wt. % relative to a total weight of the nanocomposite. In some embodiments, the nanostarch is present in the nanocomposite in an amount of 30 to 45 wt. %, preferably 31-44 wt. %, preferably 32-43 wt. %, preferably 34-42 wt. %, preferably 36-40 wt. wt. %. In a preferred embodiment, 38.0%+0.3 and 49.0%+0.4 of starch and cellulose is present in the nanocomposite.

In some embodiments, the biobased dental filler includes 1 to 5 wt. %, preferably 1.5-4.5 wt. %, and preferably 1.7-4 wt. %, 2-3.5 wt. % of the calcium mixture relative to the total weight of the biobased dental filler. In some embodiments, the biobased dental filler further includes a calcium mixture consisting of 1 to 5 wt. %, preferably 1.5-4.5 wt. %, preferably 1.7-4 wt. %, and preferably 2-3.5 wt. %, of (calcium oxide) CaO relative to a total weight of the calcium mixture, wherein the calcium mixture includes an oyster shell, CaO, and a calcium phosphate cement. In a preferred embodiment, the dental filler consists of 2 wt. % of CaO relative to a total weight of calcium mixture.

In some embodiments, the biobased dental filler includes 2 to 8 wt. %, preferably 3-7 wt. % and preferably 4-6 wt. % of a zinc mixture including ZnO and zinc phosphate ($Zn_3(PO_4)_2$) relative to a total weight of the biobased dental filler. In a preferred embodiment, the biobased dental filler consists of 2% of ZnO and 2% of $Zn_3(PO_4)_2$.

In some embodiment, the biobased dental filler consisting of a nanocomposite wherein the nanostarch has an average particle size of 16 nm or less, preferably 15 nm or less, preferably 14 nm or less, and 13 nm or less; the nanocellulose has an average particle size of 18 nm or less, preferably 17 nm or less, preferably 16 nm or less, preferably 15 nm or less. In a preferred embodiment, the average particle size of nanostarch and nanocellulose is 13 nm and 15 nm.

Figure 1A:
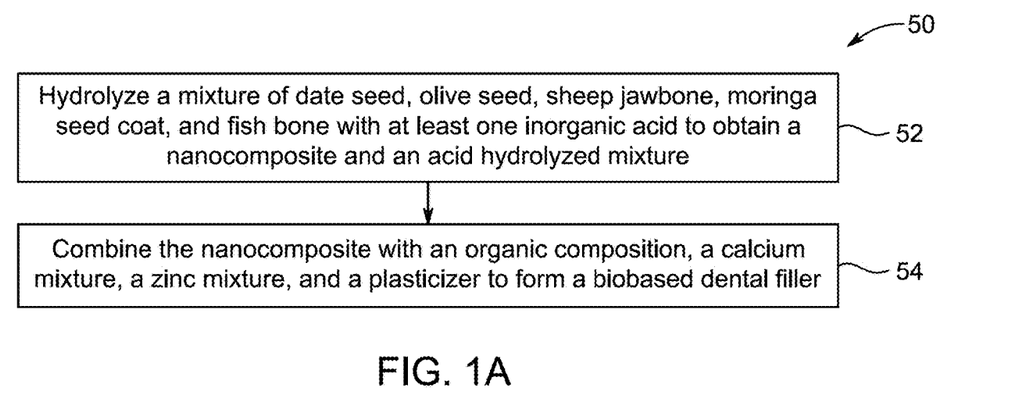
FIG. 1A is a schematic flow chart of a method of producing a biobased dental filler, according to certain embodiments.

FIG. 1 illustrates a schematic flow chart of a method 50 of preparing the biobased dental filler. The order in which the method 50 is described is not intended to be construed as a limitation, and any number of the described method steps can be combined to implement the method 50. Additionally, individual steps may be removed or skipped from the method 50 without departing from the spirit and scope of the present disclosure.

At step 52, the method 50 includes hydrolyzing a mixture of date seed, olive seed, sheep jawbone, moringa seed coat, and fish bone with at least one inorganic acid to obtain the nanocomposite and the acid hydrolyzed mixture. In some embodiments, the method of hydrolysis includes, but is not limited to, acid-catalyzed hydrolysis, base-catalyzed hydrolysis, enzymatic hydrolysis, microwave-assisted hydrolysis, and supercritical fluid hydrolysis. In a preferred embodiment, acid hydrolysis is employed to convert micro-sized particles into nano-sized particles.

In some embodiments, the inorganic acid may include, but are not limited to, sulfuric acid ($H_2SO_4$), nitric acid ($HNO_3$), phosphoric acid ($H_3PO_4$), hydrofluoric acid (HF), trifluoroacetic acid, perchloric acid ($HCl_4$), hydrobromic acid (HBr), hydroiodic acid (HI), chromic acid ($H_2CrO_4$), boric acid ($H_3BO_3$), periodic acid ($HIO_4$), selenic acid ($H_2SeO_4$), telluric acid ($H_6TeO_6$), sulfurous acid ($H_2SO_3$), nitrous acid ($HNO_2$), hypochlorous acid (HClO), chloric acid ($HClO_3$), iodic acid ($HIO_3$), bromic acid ($HBrO_3$), fluorosilicic acid ($H_2SiF_6$), carbonic acid ($H_2CO_3$), arsenic acid ($H_3AsO_4$), antimonic acid ($HSbO_3$), tungstic acid ($H_2WO_4$), vanadic acid ($H_3VO_4$), manganic acid ($H_2MnO_4$), pyrophosphoric acid ($H_4P_2O_7$), metaphosphoric acid ($HPO_3$), formic acid (HCOOH), and acetic acid ($CH_3COOH$).

In a preferred embodiment, the inorganic acid is concentrated HCl, $HNO_3$ or $H_2SO_4$. The concentration of HCl is about 80-90%. In some embodiments, HCl concentrations are about 81%, 82%, 83%, 84%, 85%, 86%, 87%, 88%, 89%, and 90%. In some embodiments, the inorganic acid is sulfuric acid. The sulfuric acid concentrations are about 90-95%, including 91%, 92%, 93%, 94%, and 95%. The nitric acid concentrations are about 90-95%, including 91%, 92%, 93%, 94%, and 95%.

In an embodiment, each component of the mixture is hydrolyzed individually to obtain their respective nanoparticles. The inorganic acid is hydrochloric acid and nitric acid. For date seed, 84% hydrochloric acid (HCl) is used; for moringa seed coat starch and olive seed cellulose, a mixture of 84% hydrochloric acid (HCl) and 92% nitric acid ($HNO_3$) is applied; and for fish bone and sheep jawbone, 94% sulfuric acid ($H_2SO_4$) is used.

At step 54, the method 50 includes combining the nanocomposite with the organic composition, a calcium mixture, a zinc mixture, and a plasticizer to form the biobased dental filler. In a preferred embodiment, Plasticizer polylactic acid (5%), silicon (2%), fish scale resin (1%) and calcium phosphates cement (2%), CaO (2%), ZnO (2%), $Zn_3$ ($PO_4$) 2 (2%) oyster shell nanoparticle (2%), acrylate polymer (3%), cellulose (2%) and corn starch (3%), arrowroot powder (2%), alginate (2%) are used to form bidental filler.

Figure 1B:
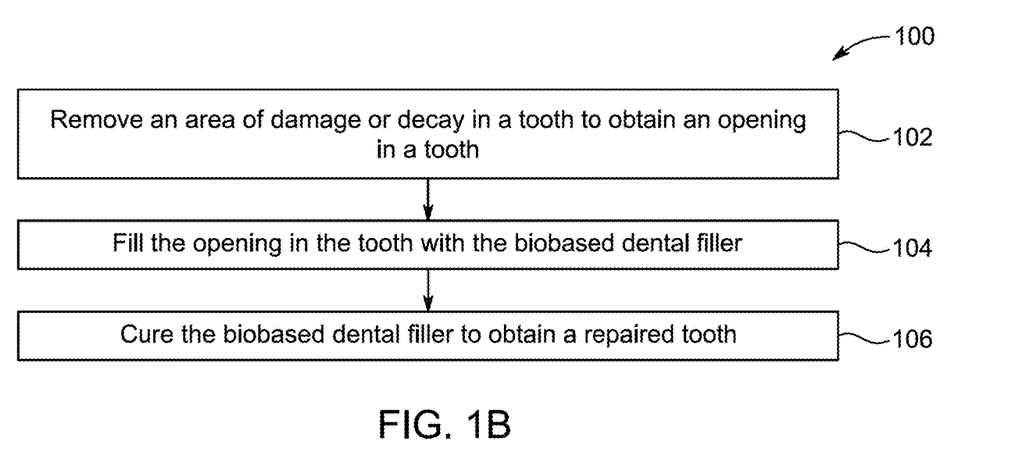
FIG. 1B is a schematic flow chart of a method of repairing a damaged tooth with the biobased dental filler, according to certain embodiments.

FIG. 1B illustrates a schematic flow chart of a method 100 of repairing a damaged tooth with the biobased dental filler. The order in which the method 100 is described is not intended to be construed as a limitation, and any number of the described method steps can be combined to implement the method 100. Additionally, individual steps may be removed or skipped from the method 100 without departing from the spirit and scope of the present disclosure.

At step 102, the method 100 includes removing an area of damage or decay in a tooth to obtain an opening in the tooth.

At step 104, the method 100 includes filling the opening in the tooth with the biobased dental filler.

At step 106, the method 100 includes curing the biobased dental filler to obtain a repaired tooth. In some embodiments, the curing is photocuring or thermal curing wherein, the curing includes curing with a photocuring device for 10 to 30 seconds (sec), preferably 11-29 sec, preferably 12-27 sec, preferably 13-25 sec, preferably 14-23 sec, preferably 15-21 sec, preferably 16-19 sec and preferably 17-18 sec at a light intensity of 250 to 850 milliwatts per square centimeter ($mW/cm^2$), preferably 270-830 $mW/cm^2$, preferably 300-800 mW/cm², preferably 330-770 mW/cm², preferably 360-740 mW/cm², preferably 400-700 mW/cm², preferably 450-650 mW/cm², preferably 500-600 mW/cm² and preferably 550-590 mW/cm².

Examples

The following examples demonstrate a biobased dental filler as described herein. The examples are provided solely for illustration and are not to be construed as limitations of the present disclosure, as many variations thereof are possible without departing from the spirit and scope of the present disclosure.

Example 1: Materials Used and Method of Preparation

In the present disclosure, the technology may be described in various stages. It includes pyrolysis (drying by heating) of the combination of the samples (date seed starch, olive seed cellulose, moringa seed coat starch, fish bone and beef feet toes bones) at 139° C. in the oven for 3.5 hours. Further, acid hydrolysis was performed in the experiment to convert the micro to nano particles of date seed (with 84% HCl), moringa seed coat starch and olive seed cellulose (with 84% HCl and 92% $HNO_3$) and fish bone and sheep jawbone (94% $H_2SO_4$). Still further, plasticizer polylactic acid (5%), silicon (2%), fish scale resin (1%), calcium phosphates cement (2%), calcium oxide (CaO) (2%), zinc oxide (ZnO) (2%), zinc phosphate ($Zn_3(PO_4)_2$) (2%), oyster shell nanoparticle (2%), acrylate polymer (3%), cellulose (2%), corn starch (3%), arrowroot powder (2%), alginate (2%) were used. Furthermore, a mixture of organic substances (aloe vera gel, okra gel, aroids peel gel, *acacia nilotica* gum, natural glue (*Lannea* sp), jackfruit latex, glycerin from animal (beef feet toes) sources were used. Further, nutritive substances such as olive leaf extract and moringa leaf extract (contains antioxidant and minerals), fish bone powder as mineral sources, sheep jawbone powder as calcium sources were used. Still further, organic pigments or dyes as antioxidant (dragon peel dye, beetroot dye, ajwa date coating dye, black cumin seed dye) pigment or dye as anthocyanin) were used.

Example 2: PH, Antioxidant, Cellulose, and Starch Determination pH, antioxidant, cellulose, and starch determination of nanocomposite dental filler of the present disclosure was determined, and their values were compared to synthetic dental devices available in the market. The quantitative determination of pH, antioxidant, cellulose, and starch determination was carried out using methods known in the art. The results of the study are depicted in Table 1.

TABLE 1 pH, antioxidant, cellulose, and starch determination

| Materials | pH determination | Starch determination | Cellulose determination | Anthocyanin as antioxidant (mg/100 g) |
|---|---|---|---|---|
| Nanocomposite dental filler | 7.97 ± 0.05 | 38.0% ± 0.3 | 49.0% ± 0.4 | 107 |
| Synthetic dental filler | Alkaline ≥ 7 | It is zero if from gas or oil; if from starch sample, it is 10-40%. | It is zero if from gas or oil, if from cellulose sample it is 20-50%. | 0 |

Mean ± SE (standard Error, n = 3)

Example 3: Nanostarch, Nanocellulose, Carotene, and Polyphenol Measurement

The particle size of the nanostarch, nanocellulose, carotene, and polyphenol was measured by scanning electron microscopy (SEM), and the results indicate that average nanoparticle size of nanocomposite biomaterial was 14 nanometres (nm) (nanostarch: 13 nm and nanocellulose: 15 nm); in comparison, the nanoparticle size range for standard synthetic organic dental filler, which typically falls between 1 and 100 nm. This suggests that the nanocomposite dental filler has a finer particle size, potentially offering unique properties and advantages in dental device applications.

TABLE 2

Nanostarch, nanocellulose, carotene, and polyphenol measurement

| Materials | Nanostarch size | Nanocellulose size | Carotene content mg/g | Polyphenol (mg/100) |
|---|---|---|---|---|
| Nanocomposite dental filler | 13 nm | 15 nm | 3.7 | 50 |
| Synthetic dental filler | 1-100 nm (standard) | 1-100 nm (standard) | 0 | 0 |

Example 4: Moisture, Odor and Viscosity Test in Dental Filler Biomaterial (as ASTM D3801)

The nanocomposite dental filler prepared was further evaluated for their ability to absorb moisture. The tests to determine water absorption were carried out in accordance with ASTM D3801. The purpose of ASTM D3801 is to determine the rate of water absorption by immersing the specimen (nanocomposite dental filler) in water for a specific period of time. In the test, the nanocomposite dental filler absorbed 9% water and that of synthetic dental filler absorbed 1%-30% water. Water absorption was calculated by determining the percentage increase in weight of the sample following the experiment to characterize the attribute. The results of the study are depicted in Table 3. It may be observed that the water absorption for the nanocomposite dental filler prepared by the present disclosure is very low compared to synthetic dental filler-suggesting their water-resistant property.

TABLE 3

Determination of Moisture, odor and viscosity test in dental filler biomaterial.

| Materials | Moisture percent | Viscosity (cSt) | Odor |
|---|---|---|---|
| Nanocomposite dental filler | 9% | 29 | Low odor |
| Synthetic dental filler by ASTM D3801 | Maximum 1%-30% | 15-30 | Low odor |

Example 5: Determination of Chemical Element Test in Dental Filler Biomaterial Chemical element tests, such as Na, K, $CO_3^-$, Cl, Ca, Si, Fe, Pb, Cu, Al, Sn, Zn, Ni and Mn were determined using the EN (166) [European Norm, 166] standardization. Similar results were exhibited when compared to synthetic dental devices. All the elements showed values under the standard. The results of the study are depicted in Table 4.

TABLE 4

Determination of chemical element test in dental filler biomaterials

| Chemical Elements (ppm) | Nanocomposite dental Filler (ppm) | Synthetic dental filler by EN (European Standard EN166) |
|---|---|---|
| K | 9.7 ± 0.4 | 10 |
| Na | 4.2 ± 0.2 | 5 |
| Cl | 0.45 ± 0.01 | 2 |
| $CO_3^-$ | 166 ± 1.1 | 440-5 |
| Ca | 10.0 ± 0.21 | 10 |
| Si | 2.7 ± 0 | 5 |
| Fe | 1.8 ± 0 | 5 |
| Cu | 0.39 ± 0 | 5 |
| Al | 1.5 ± 0 | 5 |
| Zn | 3.6 ± 0 | 5 |
| Ni | 0.02 ± 0 | 5 |
| Mg | 2 ± 0 | 5 |
| P | 9.1 ± 0 | 10 |
| Mn | 3 ± 0 | 5 |

Mean ± standard error (SE, n = 3)

Example 6: Effects of Organic Nanocomposite and Synthetic Materials on Sheep Bone The nanocomposite dental filler prepared were further evaluated on sheep bone.

Figure 2A:
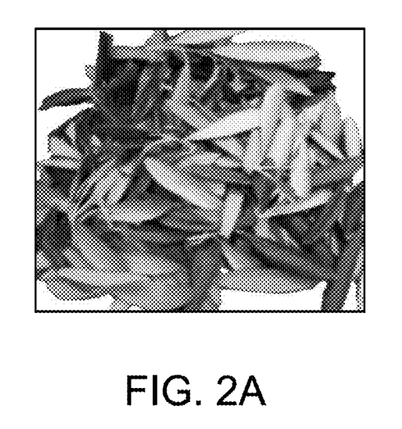
FIG. 2A is an image depicting olive leaf, according to certain embodiments.
Figure 2B:
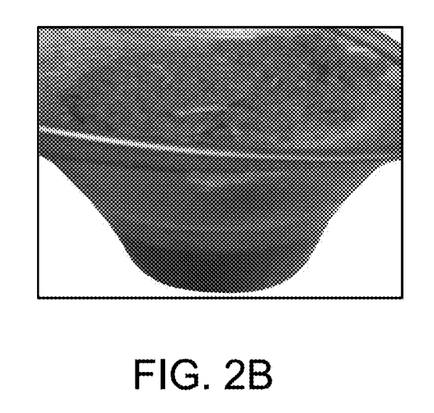
FIG. 2B is an image depicting olive leaf extract, according to certain embodiments.
Figure 2C:
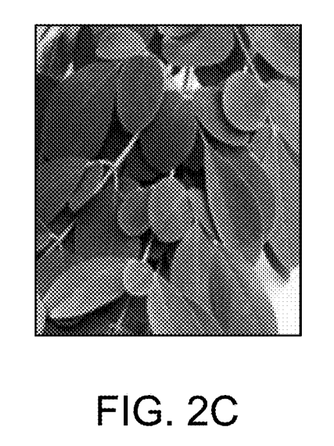
FIG. 2C is an image depicting moringa leaf, according to certain embodiments.
Figure 2D:
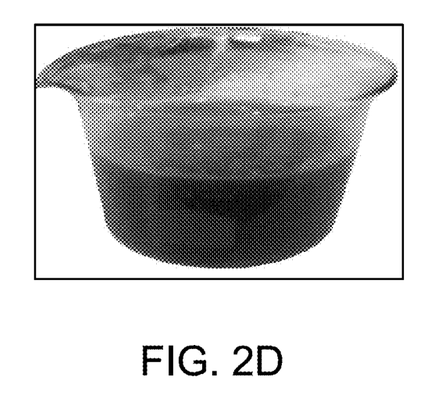
FIG. 2D is an image depicting moringa leaf extract, according to certain embodiments.
Figure 2E:
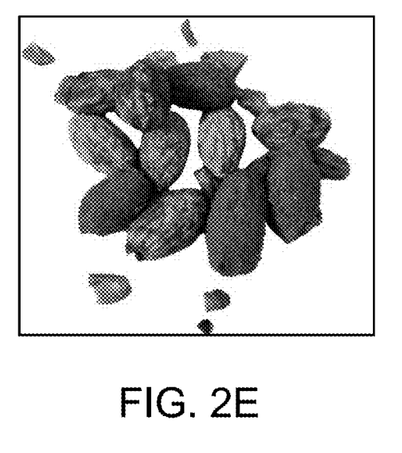
FIG. 2E is an image depicting olive seed, according to certain embodiments.
Figure 2F:
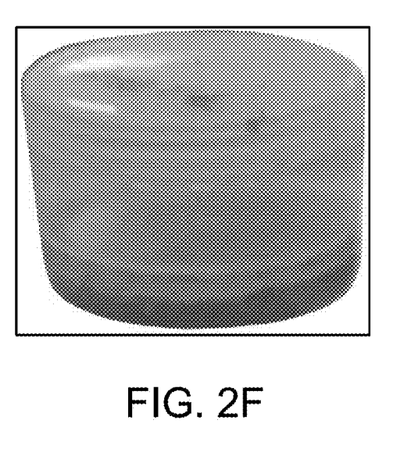
FIG. 2F is an image depicting olive seed nanocellulose by acid hydrolysis, according to certain embodiments.
Figure 2G:
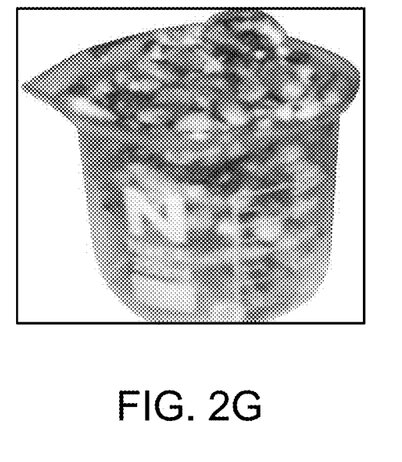
FIG. 2G is an image depicting date seed, according to certain embodiments.
Figure 2H:
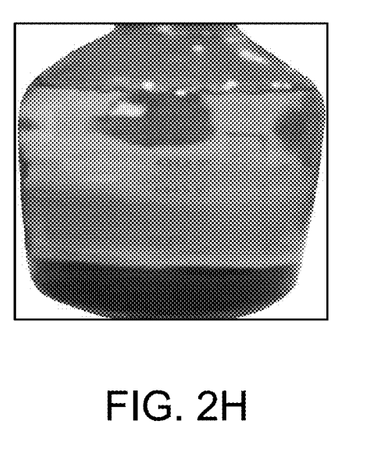
FIG. 2H is an image depicting date seed by acid hydrolysis, according to certain embodiments.
Figure 2I:
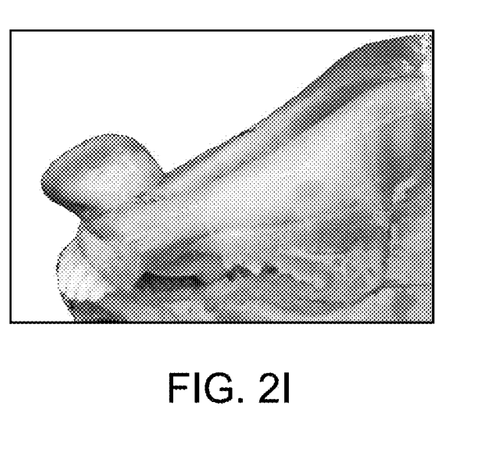
FIG. 2I is an image depicting sheep jawbone, according to certain embodiments.
Figure 2J:
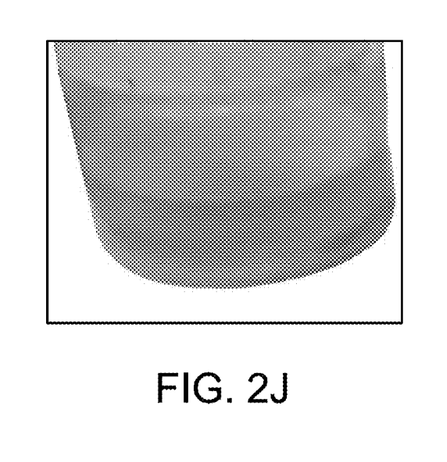
FIG. 2J is an image depicting sheep jawbone by acid hydrolysis, according to certain embodiments.
Figure 2K:
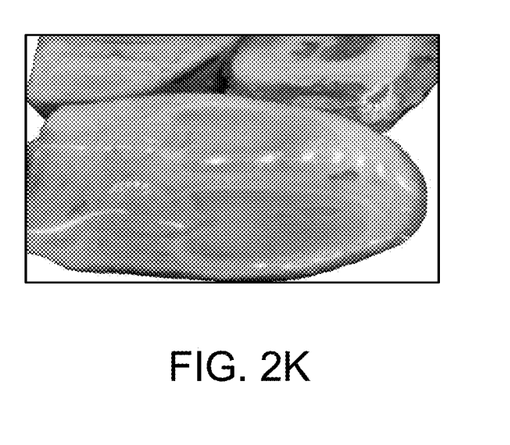
FIG. 2K is an image depicting beef toes, according to certain embodiments.
Figure 2L:
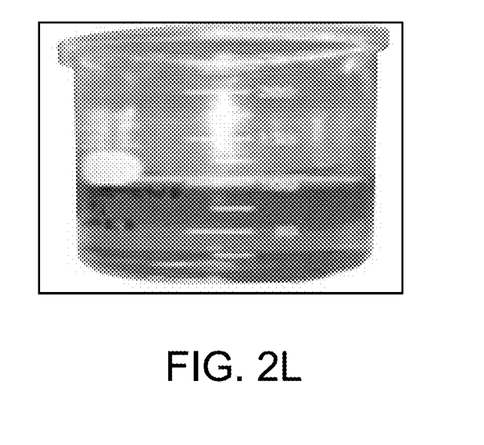
FIG. 2L is an image depicting glycerin, according to certain embodiments.
Figure 2M:
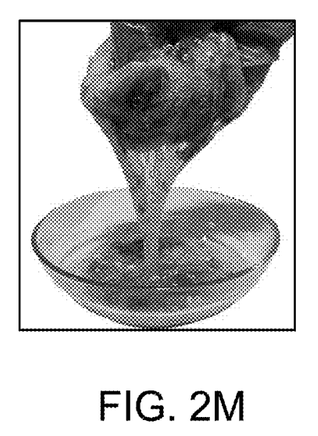
FIG. 2M is an image depicting okra gel, according to certain embodiments.
Figure 2N:
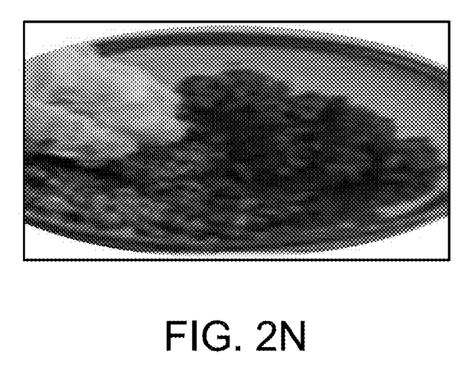
FIG. 2N is an image depicting different moringa seed, according to certain embodiments.
Figure 2O:
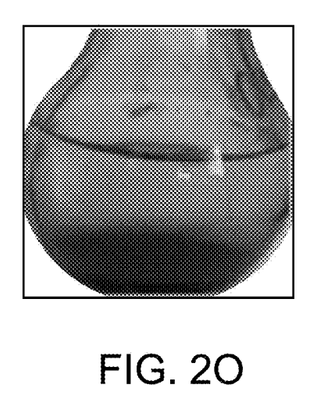
FIG. 2O is an image depicting different moringa seed nanostarch, according to certain embodiments.
Figure 2P:
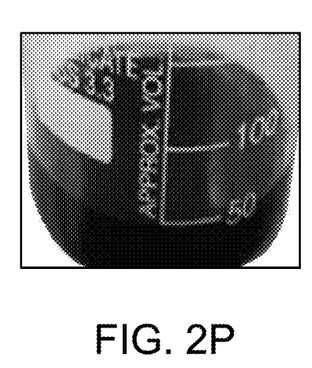
FIG. 2P is an image depicting black seed and seed dye, according to certain embodiments.
Figure 2Q:
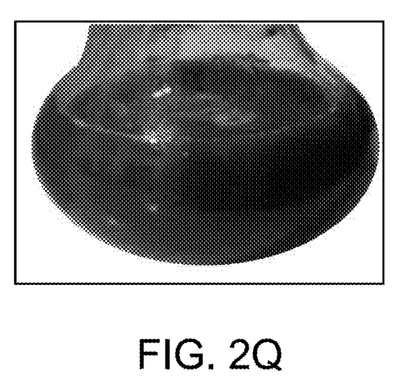
FIG. 2Q is an image depicting velvet apple dye, according to certain embodiments.
Figure 2R:
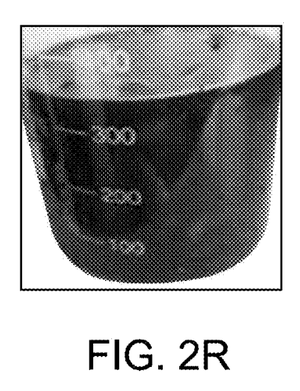
FIG. 2R is an image depicting beetroot peels dye, according to certain embodiments.
Figure 2S:
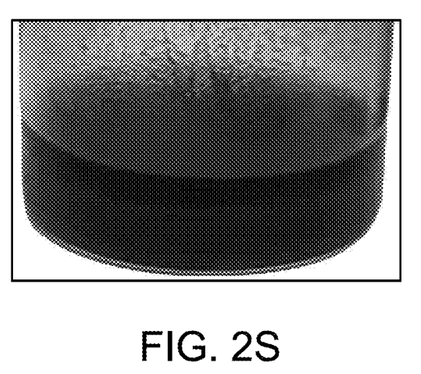
FIG. 2S is an image depicting ajwa dates dye, according to certain embodiments.
Figure 2T:
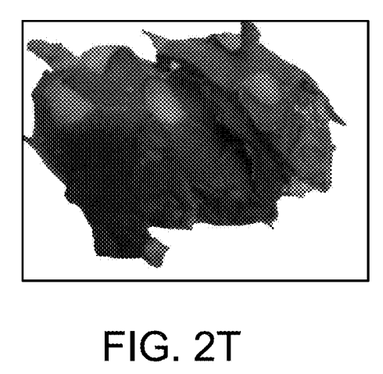
FIG. 2T is an image depicting dragon peel, according to certain embodiments.
Figure 2U:
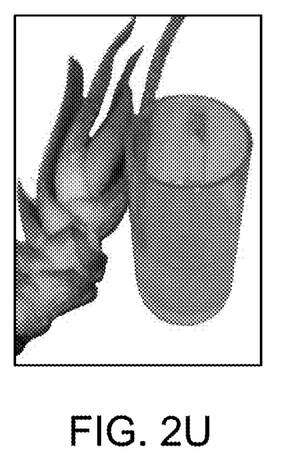
FIG. 2U is an image depicting olive leaf extract and aloe vera gel, according to certain embodiments.
Figure 2V:
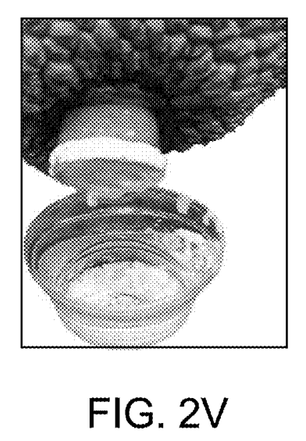
FIG. 2V is an image depicting jackfruit latex, according to certain embodiments.
Figure 2W:
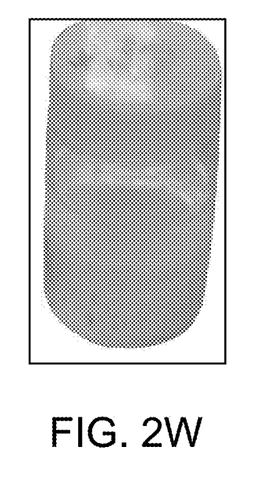
FIG. 2W is an image depicting oyster shell powder, according to certain embodiments.
Figure 2X:
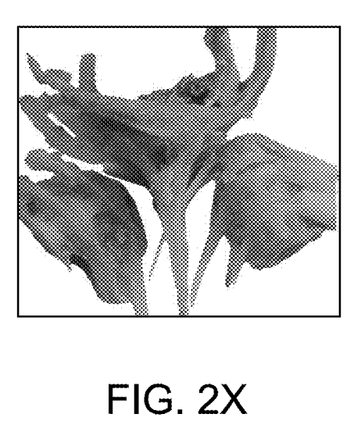
FIG. 2X is an image depicting fishbone, according to certain embodiments.
Figure 2Y:
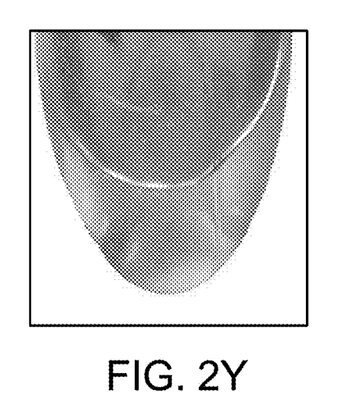
FIG. 2Y is an image depicting nanoparticles, according to certain embodiments.
Figure 2Z:
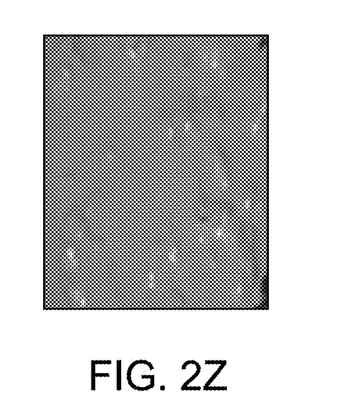
FIG. 2Z is an image depicting nanocomposite, according to certain embodiments.
Figure 3A:
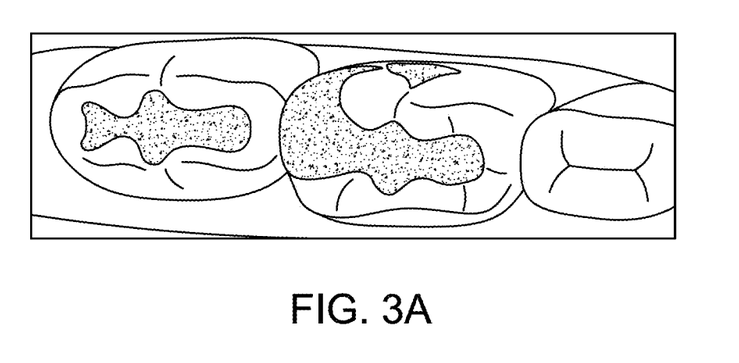
FIG. 3A is an image depicting synthetic filling teeth (damaged or cracked teeth, according to certain embodiments.
Figure 3B:
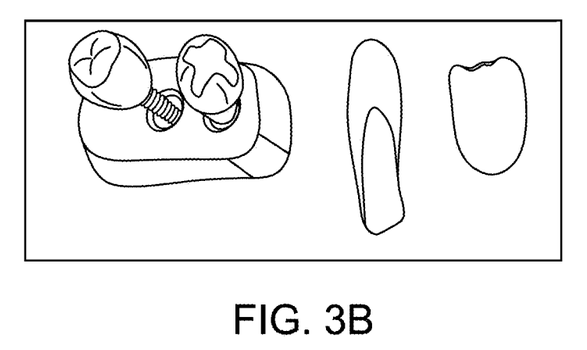
FIG. 3B and FIG. 3C is an image depicting biomaterial, according to certain embodiments.
Figure 3C:
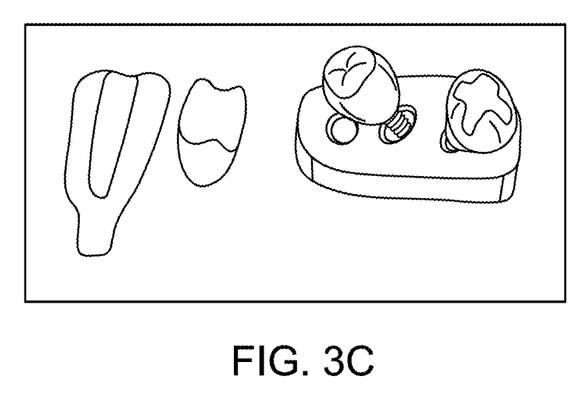
Figure 3D:
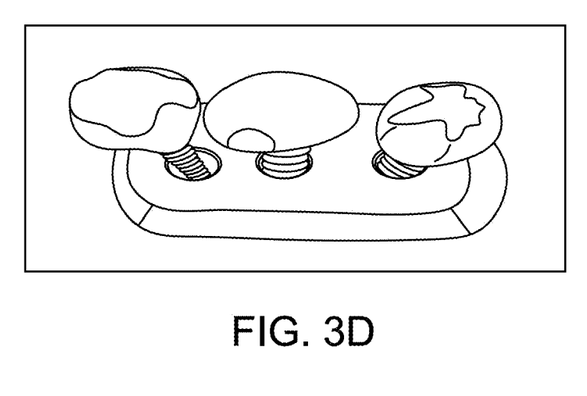
FIG. 3D is an image depicting filling by nanocomposite filler, according to certain embodiments.

The present disclosure clearly shows that nanostarch and nanocellulose based nutritive biocomposite dental filler cement biomaterial production derived from plant starch and cellulose in combination with organic sources and pigments (dyes as an antioxidant) as biocomposite starch and cellulose biopolymer FIGS. 2A-2Z may be used for medical and dental biomaterial FIGS. 3A-3D purposes as well as in manufacturing industries.

Numerous modifications and variations of the present disclosure are possible in light of the above teachings. It is therefore to be understood that within the scope of the appended claims, the invention may be practiced otherwise than as specifically described herein.

The invention claimed is:

1. A biobased dental filler, comprising:
   a nanocomposite comprising a mixture of nanostarch and nanocellulose obtained from date seed, olive seed, and moringa seed coat;
   a dye mixture containing root beet dye, ajwa date pigment, and black cumin seed pigment;
   an adhesive mixture containing an okra gel, an aloe vera gel, and an aroid root gum;
   a beef toe-based glycerin;
   an acrylate polymer;
   an acid hydrolyzed mixture comprising sheep jawbone and fish bone; and
   an organic composition comprising at least one selected from the group consisting of cellulose, corn starch, fish scale resin, arrowroot powder, alginate, aroid peel gel, *Acacia nilotica* gum, *Lannea* sp. natural glue, jackfruit latex, dragon peel dye, and beetroot dye.

2. The biobased dental filler of claim 1, wherein the biobased dental filler has a carotene content of 1 to 10 mg per g of the biobased dental filler.

3. The biobased dental filler of claim 1, wherein the biobased dental filler has a polyphenol content of 40 to 60 mg per 100 g of the biobased dental filler.

4. The biobased dental filler of claim 1, wherein the biobased dental filler has an anthocyanin content of 95 to 115 mg per 100 g of the biobased dental filler.

5. The biobased dental filler of claim 1, further comprising at least one plasticizer selected from the group consisting of glycerol triacetate, triethyl citrate, acetyl tributyl citrate, polyethylene glycol, polylactic acid, diisononyl phthalate, di(2-ethylhexyl) phthalate, diisodecyl phthalate, and epoxidized soybean oil.

6. The biobased dental filler of claim 1, wherein the nanocellulose is present in the nanocomposite in an amount of 40 to 60 wt. % relative to a total weight of the nanocomposite.

7. The biobased dental filler of claim 1, wherein the nanostarch is present in the nanocomposite in an amount of 30 to 45 wt. % relative to a total weight of the nanocomposite.

8. The biobased dental filler of claim 1, wherein the nanostarch has an average particle size of 16 nm or less.

9. The biobased dental filler of claim 1, wherein the nanocellulose has an average particle size of 18 nm or less.

10. The biobased dental filler of claim 1, further comprising polylactic acid.

11. The biobased dental filler of claim 1, further comprising a calcium mixture comprising 1 to 5 wt. % of CaO relative to a total weight of the calcium mixture, wherein the calcium mixture comprises oyster shell, CaO and a calcium phosphate cement.

12. The biobased dental filler of claim 11, wherein the biobased dental filler comprises 1 to 5 wt. % of the calcium mixture relative to a total weight of the biobased dental filler.

13. The biobased dental filler of claim 1, further comprising 2 to 8 wt. % of a zinc mixture comprising ZnO and $Zn_3(PO_4)_2$ relative to a total weight of the biobased dental filler.

14. A method of producing the biobased dental filler of claim 1, comprising:
hydrolyzing a mixture of date seed, olive seed, sheep jawbone, moringa seed coat, and fish bone with at least one inorganic acid to obtain the nanocomposite and the acid hydrolyzed mixture; and
combining the nanocomposite with the dye mixture, the adhesive mixture, the beef toe-based glycerin, the acrylate polymer, the organic composition, a calcium mixture, a zinc mixture, and a plasticizer to form the biobased dental filler.

15. The method of claim 14, wherein the inorganic acid is at least one selected from the group consisting of hydrochloric acid, nitric acid, hydrobromic acid, sulfuric acid, hydrofluoric acid, and phosphorous acid.

16. The method of claim 14, wherein the inorganic acid is hydrochloric acid and nitric acid.

17. A method of repairing a damaged tooth with the biobased dental filler of claim 1, comprising:
removing an area of damage or decay in a tooth to obtain an opening in the tooth;
filling the opening in the tooth with the biobased dental filler; and
curing the biobased dental filler to obtain a repaired tooth.

18. The method of claim 17, wherein the curing is photocuring or thermal curing.

19. The method of claim 17, wherein the curing comprises curing with a photocuring device for 10 to 30 seconds at a light intensity of 250 to 850 mW/cm$^2$.

\* \* \* \* \*